United States Patent
Nagai et al.

(10) Patent No.: US 11,753,768 B2
(45) Date of Patent: Sep. 12, 2023

(54) SHEET MANUFACTURING APPARATUS AND SHEET MANUFACTURING METHOD

(71) Applicant: SEIKO EPSON CORPORATION, Tokyo (JP)

(72) Inventors: Yoshiyuki Nagai, Nagano (JP); Naoko Omagari, Nagano (JP); Masahide Nakamura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/663,438

(22) Filed: May 16, 2022

(65) Prior Publication Data
US 2022/0364306 A1   Nov. 17, 2022

(30) Foreign Application Priority Data
May 17, 2021   (JP) ................. 2021-083188

(51) Int. Cl.
*D21F 7/00*   (2006.01)
*D21F 1/66*   (2006.01)
*D21F 5/00*   (2006.01)
*D21F 5/18*   (2006.01)

(52) U.S. Cl.
CPC ............... *D21F 7/003* (2013.01); *D21F 1/66* (2013.01); *D21F 5/004* (2013.01); *D21F 5/18* (2013.01); *D21F 7/006* (2013.01)

(58) Field of Classification Search
CPC . D21F 7/003; D21F 9/00; D21F 5/004; D21F 9/04; D21F 11/06; D21F 1/66; D21F 3/0272; B27N 3/04; B27N 3/18; B27N 1/00; Y02W 30/64; D21G 7/00
See application file for complete search history.

(56) References Cited

U.S. PATENT DOCUMENTS

| | | | |
|---|---|---|---|
| 8,882,965 B2 | 11/2014 | Yamagami et al. | |
| 2014/0027075 A1 | 1/2014 | Yamagami et al. | |
| 2018/0080176 A1* | 3/2018 | Higuchi | B27N 3/04 |
| 2018/0237992 A1 | 8/2018 | Nagai et al. | |
| 2020/0080262 A1 | 3/2020 | Sago et al. | |
| 2021/0277600 A1* | 9/2021 | Gomi | B27N 3/04 |

FOREIGN PATENT DOCUMENTS

| | | |
|---|---|---|
| CN | 107109741 A | 8/2017 |
| CN | 110894283 A | 3/2020 |
| JP | 2012-144819 A | 8/2012 |
| JP | 2020-016004 A | 1/2020 |

\* cited by examiner

*Primary Examiner* — Eric Hug
*Assistant Examiner* — Matthew M Eslami
(74) *Attorney, Agent, or Firm* — Global IP Counselors, LLP

(57) ABSTRACT

A sheet manufacturing apparatus including an accumulating unit that causes a defibrated product to accumulate in a dry manner and forms a web, a moisture adding unit that adds moisture from a side of one surface of the formed web such that a moisture content of the web is equal to or more than 12 mass % and equal to or less than 40 mass %, and a heating unit that heats the web to which moisture is added. The heating unit has a first portion that comes in contact with the one surface of the web and a second portion that comes in contact with another surface of the web, and the heating unit heats the web in a state of a surface temperature of the first portion being higher than a surface temperature of the second portion.

9 Claims, 3 Drawing Sheets

| | EXAMPLE 1 | EXAMPLE 2 | EXAMPLE 3 | EXAMPLE 4 | EXAMPLE 5 | COMPARATIVE EXAMPLE 1 | COMPARATIVE EXAMPLE 2 |
|---|---|---|---|---|---|---|---|
| $T_u$ (°C) | 100 | 110 | 90 | 100 | 110 | 120 | 120 |
| $T_d$ (°C) | 140 | 130 | 140 | 130 | 120 | 120 | 110 |
| $T_d - T_u$ | 40 | 20 | 50 | 30 | 10 | 0 | -10 |
| $T_d + T_u$ | 240 | 240 | 230 | 230 | 230 | 240 | 230 |
| BINDING AGENT | ADDED | ADDED | NOT ADDED | NOT ADDED | NOT ADDED | ADDED | NOT ADDED |
| PAPER DUST AMOUNT | B | A | B | A | C | D | D |

FIG. 4

|  | EXAMPLE 1 | EXAMPLE 2 | EXAMPLE 3 | EXAMPLE 4 | EXAMPLE 5 | COMPARATIVE EXAMPLE 1 | COMPARATIVE EXAMPLE 2 |
|---|---|---|---|---|---|---|---|
| Tu (°C) | 100 | 110 | 90 | 100 | 110 | 120 | 120 |
| Td (°C) | 140 | 130 | 140 | 130 | 120 | 120 | 110 |
| Td − Tu | 40 | 20 | 50 | 30 | 10 | 0 | −10 |
| Td + Tu | 240 | 240 | 230 | 230 | 230 | 240 | 230 |
| BINDING AGENT | ADDED | ADDED | NOT ADDED | NOT ADDED | NOT ADDED | ADDED | NOT ADDED |
| PAPER DUST AMOUNT | B | A | B | A | C | D | D |

SHEET MANUFACTURING APPARATUS AND SHEET MANUFACTURING METHOD

The present application is based on, and claims priority from JP Application Serial Number 2021-083188, filed May 17, 2021, the disclosure of which is hereby incorporated by reference herein in its entirety.

BACKGROUND

1. Technical Field

The present disclosure relates to a sheet manufacturing apparatus and a sheet manufacturing method.

2. Related Art

A dry sheet manufacturing method has been proposed for reducing the size and saving energy.

For example, JP-A-2012-144819 describes a paper recycling apparatus including a dry defibrating unit that crushes and defibrates paper, a paper forming unit that forms paper with a product defibrated by the dry defibrating unit, a moisture sprayer that sprays moisture on the formed paper, and a heater roller that heats the paper on which moisture has been sprayed by the moisture sprayer.

However, when an accumulated defibrated product is given moisture from one surface side and heated as described above, a large amount of paper dust may be generated in a manufactured sheet depending on the temperature of the heater roller.

SUMMARY

According to an aspect of the present disclosure, a sheet manufacturing apparatus includes an accumulating unit that causes a defibrated product to accumulate in a dry manner and forms a web, a moisture adding unit that adds moisture from a side of one surface of the formed web such that a moisture content of the web is equal to or more than 12 mass % and equal to or less than 40 mass %, and a heating unit that heats the web to which moisture is added. The heating unit has a first portion that comes in contact with the one surface of the web and a second portion that comes in contact with another surface of the web. The heating unit heats the web in a state of a surface temperature of the first portion being higher than a surface temperature of the second portion.

According to an aspect of the present disclosure, a sheet manufacturing method includes causing a defibrated product to accumulate in a dry manner and forming a web, adding moisture from a side of one surface of the formed web such that a moisture content of the web is equal to or more than 12 mass % and equal to or less than 40 mass %, and heating, by a heating unit, the web to which moisture is added. The heating unit has a first portion that comes in contact with the one surface of the web and a second portion that comes in contact with another surface of the web. In the heating the web by the heating unit, the web is heated in a state of a surface temperature of the first portion being higher than a surface temperature of the second portion.

BRIEF DESCRIPTION OF THE DRAWINGS

FIG. 4 is a table indicating an evaluation result of a paper dust amount of a manufactured sheet.

DESCRIPTION OF EXEMPLARY EMBODIMENTS

Hereinafter, embodiments of the present disclosure will be described in detail with reference to the drawings. Note that the embodiments described below do not unreasonably limit the content of the present disclosure described in the scope of claims. In addition, all of the configurations described below are not necessarily the essential constituent elements of the present disclosure.

1. Sheet Manufacturing Apparatus

1.1. Overall Configuration

Figure 1:
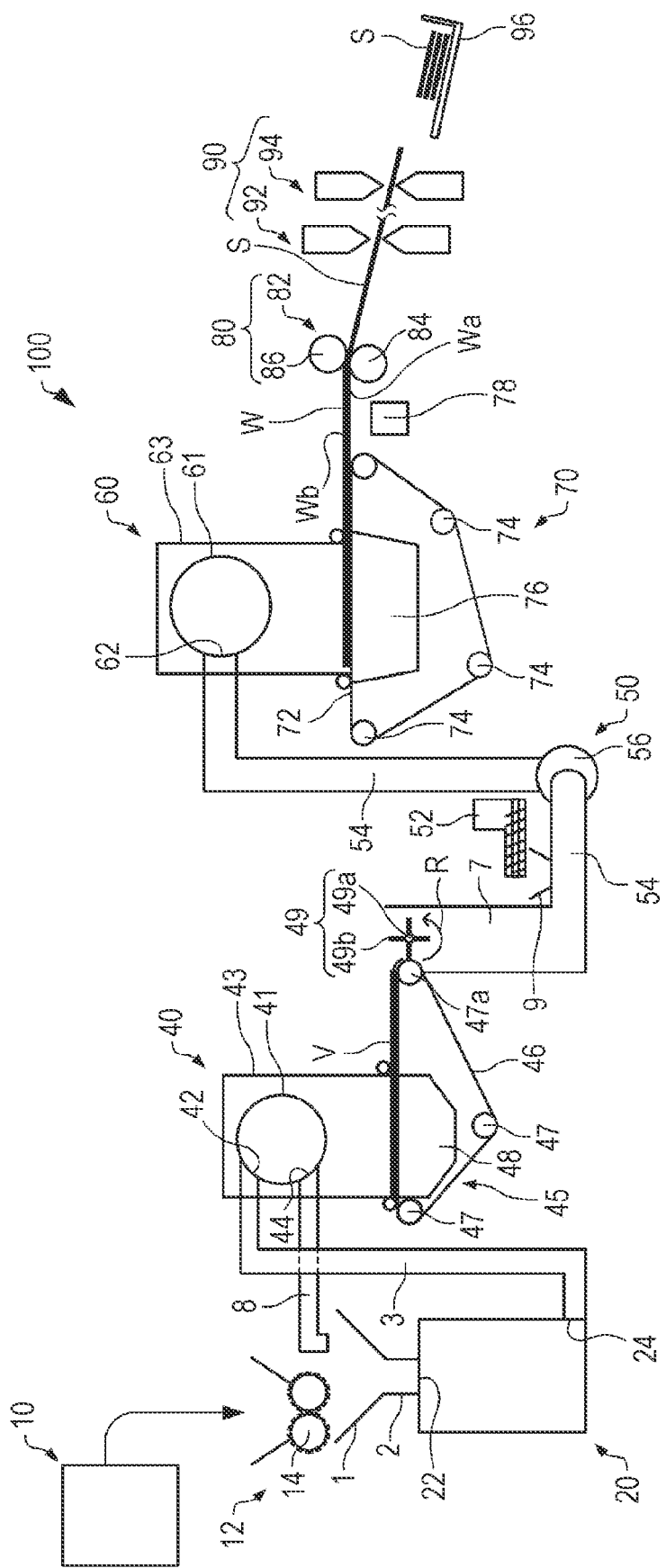
FIG. 1 is a diagram schematically illustrating a sheet manufacturing apparatus according to the present embodiment.

First, a sheet manufacturing apparatus according to the present embodiment will be described with reference to the drawings. FIG. 1 is a diagram schematically illustrating a sheet manufacturing apparatus 100 according to the present embodiment.

As illustrated in FIG. 1, the sheet manufacturing apparatus 100 includes, for example, a supply unit 10, a crushing unit 12, a defibrating unit 20, a sorting unit 40, a first web forming unit 45, a rotor 49, a mixing unit 50, an accumulating unit 60, a second web forming unit 70, a moisture adding unit 78, a sheet forming unit 80, and a cutting unit 90.

The supply unit 10 supplies a raw material to the crushing unit 12. The supply unit 10 is, for example, an automatic feeding unit for continuously feeding a raw material into the crushing unit 12. The raw material supplied by the supply unit 10 contains, for example, a fiber such as waste paper and a pulp sheet.

The crushing unit 12 cuts the raw material supplied by the supply unit 10 into strips in air, such as the atmosphere. The shape and size of the strips are, for example, a few centimeters long quadrangles. In the illustrated example, the crushing unit 12 has a crushing blade 14 and can cut the fed raw material by the crushing blade 14. As the crushing unit 12, for example, a shredder is used. The raw material cut by the crushing unit 12 is received by a hopper 1 and transported to the defibrating unit 20 via a pipe 2.

The defibrating unit 20 defibrates the raw material cut by the crushing unit 12. Here, "defibrating" refers to unraveling the raw material, which is formed of a plurality of fibers that has been bound, into individual fibers. The defibrating unit 20 also has a function to separate, from a fiber, a substance such as a resin particle, ink, toner, and a blot inhibitor adhering to the raw material.

A product that has passed through the defibrating unit 20 is referred to as a "defibrated product". A defibrated product may contain, in addition to a defibrated product fiber that has been unraveled, a resin particle separated from a fiber when the fiber is unraveled, a coloring agent such as ink and toner, an additive such as a blot inhibitor and a paper strengthening agent. An unraveled defibrated product has a string shape. The unraveled defibrated product may exist in a state of not being entangled with another unraveled fiber, that is, in a state of being independent, or may exist in a state of being entangled with another unraveled fiber and forming aggregates, that is, in a state of forming lumps.

The defibrating unit 20 performs defibration in a dry manner. Here, a dry manner refers to performing a treatment such as defibration or accumulation not in liquid but in air, such as the atmosphere. As the defibrating unit 20, for example, an impeller mill is used. The defibrating unit 20 has a function to generate an air flow for sucking a raw material and discharging a defibrated product. As a result, the defibrating unit 20 can suck the raw material together with an air flow from an introduction port 22 by the air flow the defibrating unit 20 generates, perform defibration, and transport the defibrated product to a discharge port 24. The defibrated product that has passed through the defibrating unit 20 is transported into the sorting unit 40 via a pipe 3. Note that the air flow generated by the defibrating unit 20 may be used for the air flow for transporting the defibrated product from the defibrating unit 20 to the sorting unit 40, or an air flow generating apparatus such as a blower is provided and an air flow from the apparatus may be used therefor.

The sorting unit 40 introduces the defibrated product that has been defibrated by the defibrating unit 20 from an introduction port 42 and sorts the defibrated product based on the fiber length. The sorting unit 40 has, for example, a drum portion 41 and a housing portion 43 that accommodates the drum portion 41. As the drum portion 41, for example, a sieve is used. The drum portion 41 has a mesh and can separate a first sorted product from a second sorted product. The first sorted product includes a fiber or a particle smaller than the opening of the mesh, that is, that passes through the mesh. The second sorted product includes a fiber, an unraveled fiber piece, or a lump larger than the opening of the mesh, that is, that does not pass through the mesh. For example, the first sorted product is transported to the accumulating unit 60 via a pipe 7. The second sorted product is returned to the defibrating unit 20 from a discharge port 44 via a pipe 8. Specifically, the drum portion 41 is a cylindrical sieve driven and rotated by a motor. As the mesh of the drum portion 41, for example, a wire net, an expand metal made of an expanded metal plate having a cut, and a perforated metal made of a metal plate with holes formed by a pressing machine or the like are used.

The first web forming unit 45 transports the first sorted product that has passed the sorting unit 40 to the pipe 7. The first web forming unit 45 has, for example, a mesh belt 46, a stretching roller 47, and suction mechanism 48.

The suction mechanism 48 can suck the first sorted product that has passed through the opening of the sorting unit 40 and is dispersed in the air onto the mesh belt 46. The first sorted product accumulates on the mesh belt 46, which is moving, to form a web V. The basic configurations of the mesh belt 46, the stretching roller 47, and the suction mechanism 48 are the same as the configurations of a mesh belt 72, a stretching roller 74, and a suction mechanism 76 of the second web forming unit 70, which will be described later.

After passing through the sorting unit 40 and the first web forming unit 45, the web V contains a lot of air and is formed into a soft and inflated state. The web V accumulating on the mesh belt 46 is charged into the pipe 7 and is transported to the accumulating unit 60.

The rotor 49 can cut the web V. In the illustrated example, the rotor 49 has a base portion 49a and a protruding portion 49b that protrudes from the base portion 49a. The protruding portion 49b has, for example, a plate shape. In the illustrated example, four protruding portions 49b are provided at equal intervals. As the base portion 49a rotates in a direction R, the protruding portions 49b can rotate around the base portion 49a serving as an axis. Since the rotor 49 cuts the web V, for example, fluctuations per unit time in the amount of the defibrated product supplied to the accumulating unit 60 can be reduced.

The rotor 49 is provided near the first web forming unit 45. In the illustrated example, the rotor 49 is provided near a stretching roller 47a located downstream in the path of the web V. The rotor 49 is provided at a position where the protruding portions 49b can come in contact with the web V and does not come in contact with the mesh belt 46 on which the web V accumulates. As a result, the mesh belt 46 can be inhibited from being worn away by the protruding portions 49b. The shortest distance between the mesh belt 46 and the protruding portions 49b is, for example, equal to or more than 0.05 mm and equal to or less than 0.5 mm. This is the distance at which the web V can be cut without the mesh belt 46 being damaged.

The mixing unit 50 mixes, for example, the first sorted product that has passed through the sorting unit 40 with an additive. The mixing unit 50 has, for example, an additive supply unit 52 that supplies an additive, a pipe 54 that transports the first sorted product and the additive, and a blower 56. In the illustrated example, the additive is supplied to the pipe 54 from the additive supply unit 52 via a hopper 9. The pipe 54 communicates with the pipe 7.

In the mixing unit 50, the blower 56 generates an air flow and can transport the first sorted product and the additive while they are mixed together in the pipe 54. Note that the mechanism for mixing the first sorted product with the additive is not particularly limited, and may be a mechanism that stirs the first sorted product and the additive by a blade rotating at a high-speed, or may be a mechanism that uses rotation of a container such as a V-shaped mixer.

As the additive supply unit 52, a screw feeder as illustrated in FIG. 1, a disk feeder (not illustrated), or the like is used. The additive supplied from the additive supply unit 52 is not particularly limited, and includes, for example, a binding agent that binds a plurality of fibers. The details of the binding agent will be described later. The additive supplied from the additive supply unit 52 may have a fibrous shape or a powdery shape.

Note that, depending on the type of sheet to be manufactured, the additive supplied from the additive supply unit 52 may include a colorant for coloring fibers, an aggregation inhibiter for inhibiting fibers from aggregating, or a flame retardant for making fibers and the like flame-retardant. A mixture that has passed through the mixing unit 50 is transported to the accumulating unit 60 via the pipe 54.

The accumulating unit 60 introduces the mixture that has passed through the mixing unit 50 from an introduction port 62, loosens entangled defibrated products, and causes the defibrated products to fall while dispersing the defibrated products in air. The accumulating unit 60 causes each of the defibrated products to accumulate in a dry manner and forms a web W. Moreover, when the resin of the additive supplied from the additive supply unit 52 has a fibrous shape, the accumulating unit 60 loosens the entangled resin. As a result, the accumulating unit 60 can cause the mixture to accumulate uniformly in the second web forming unit 70.

The accumulating unit 60 has, for example, a drum portion 61 and a housing portion 63 that accommodates the drum portion 61. As the drum portion 61, for example, a cylindrical sieve that rotates is used. The drum portion 61 has a mesh and causes a fiber or a particle contained in the mixture, which has passed the mixing unit 50, and smaller than the opening of the mesh to fall. The configuration of the drum portion 61 is, for example, the same as the configuration of the drum portion 41.

Note that the sieve of the drum portion 61 does not have to have a function to sort a specific object. This means that the sieve used as the drum portion 61 is a portion including a mesh, and the drum portion 61 may cause all of the mixture introduced to the drum portion 61 to fall.

In the second web forming unit 70, a passing product that has passed the accumulating unit 60 accumulates, and the web W is formed. The second web forming unit 70 has, for example, the mesh belt 72, the stretching roller 74, and the suction mechanism 76.

The passing product that has passed through the opening of the accumulating unit 60 accumulates on the mesh belt 72. The mesh belt 72 is stretched by the stretching roller 74 and is configured to be difficult to pass the passing product and configured to pass air. The mesh belt 72 moves as the stretching roller 74 rotates on its axis. As the mesh belt 72 continuously moves and the passing product that has passed through the accumulating unit 60 continuously falls and accumulates, the web W is formed on the mesh belt 72.

The suction mechanism 76 is provided below the mesh belt 72. The suction mechanism 76 can generate an air flow directing downward. With the suction mechanism 76, the mixture that is dispersed in the air by the accumulating unit 60 can be sucked onto the mesh belt 72. As a result, the discharging speed from the accumulating unit 60 can be increased. Moreover, with the suction mechanism 76, a down flow can be formed in the falling path of the mixture, as a result of which a defibrated product and an additive are prevented from mutually entangled during falling.

As described above, after passing through the accumulating unit 60 and the second web forming unit 70, the web W containing a lot of air and being in a soft and inflated state is formed.

The web W that accumulates is given moisture on the way to be transported to the sheet forming unit 80. The moisture is added by the moisture adding unit 78. The details of the moisture adding unit 78 will be described later.

The web W, to which moisture has been added by the moisture adding unit 78, is transported to the sheet forming unit 80.

The sheet forming unit 80 forms a sheet S by pressurizing and heating the web W that accumulates on the mesh belt 72. The sheet forming unit 80 has a heating unit 82 for pressurizing and heating the web W. The details of the heating unit 82 will be described later.

The cutting unit 90 cuts the sheet S that has been formed by the sheet forming unit 80, that is, the web W that has been heated. In the illustrated example, the cutting unit 90 has a first cutting unit 92 that cuts the sheet S in a direction intersecting the transporting direction of the sheet S and a second cutting unit 94 that cuts the sheet S in a direction parallel to the transporting direction. The second cutting unit 94 cuts, for example, the sheet S that has passed through the first cutting unit 92.

In this way, the sheet S, which is a cut sheet in a predetermined size, is formed. The sheet S, which is a cut sheet, is discharged into a discharge receiving portion 96.

1.2. Additive Supply Unit

The additive supply unit 52 is, for example, a binding agent adding unit that adds a binding agent to at least one of the defibrated product and the web W. The binding agent binds a plurality of fibers. The additive supply unit 52 may add the binding agent to the defibrated product and not add the binding agent to the web W, may add the binding agent to the web W and not add the binding agent to the defibrated product, or may add the binding agent to both the defibrated product and the web W. In addition, the additive supply unit 52 may add the binding agent to the web V.

Examples of the binding agent supplied from the additive supply unit 52 include a water-soluble polysaccharide and resin. However, in that the environmental feasibility of the sheet is further improved, preferably the additive does not contain resin.

A water-soluble polysaccharide refers to a polysaccharide that is soluble in water, warm water, or hot water. Examples of the water-soluble polysaccharide include starch and dextrin.

Starch is a polymer, which is a glycoside bond of a plurality of α-glucose molecules. The starch may be linear or branched. Starch derived from various plants may be used. Examples of the raw material of the starch include grains such as corn, wheat, and rice, beans such as fava beans, green beans, and red beans, potatoes such as potatoes, sweet potatoes, tapioca, wild grasses such as dogtooth violets, bracken, arrowroots, and palms such as sago palms.

In addition, as the starch, processed starch and modified starch may be used. Examples of the processed starch include an acetylated adipic acid cross-linked starch, an acetylated starch, an oxidized starch, a starch sodium octenylsuccinate, a hydroxypropyl starch, a hydroxypropylated phosphate-crosslinked starch, a phosphorylated starch, a phosphoric ester phosphate-crosslinked starch, a urea phosphorylated ester starch, a sodium carboxymethyl starch, and a high-amylose corn starch. Examples of the modified starch include an a starch, dextrin, lauryl poly-glucose, a cationized starch, a thermoplastic starch, and a carbamic acid starch. Note that dextrin obtained by processing or modifying starch may be preferably used.

The resin is a thermoplastic resin or a thermosetting resin, and examples include acrylonitrile styrene (AS) resin, acrylonitrile butadiene styrene (ABS) resin, polypropylene, polyethylene, polyvinyl chloride, polystyrene, acrylic resin, polyester, polyethylene terephthalate, polyphenylene ether, polybutylene terephthalate, nylon, polyamide, polycarbonate, polyacetal, polyphenylene sulfide, and polyether ether ketone. These types of resin may be used individually or in combination appropriately.

The content of a binding agent in the sheet is, for example, equal to or more than 0.1 mass % and equal to or less than 50 mass %, preferably equal to or more than 1 mass % and equal to or less than 40 mass %, and more preferably equal to or more than 1 mass % and equal to or less than 30 mass %.

1.3. Moisture Adding Unit

The moisture adding unit 78 adds, from a first surface Wa side of the web W, moisture to the web W that has been formed. Specifically, the moisture adding unit 78 adds moisture to the web W from the first surface Wa side. The web W has the first surface Wa and a second surface Wb facing directions opposite from each other. The first surface Wa is one surface of the web W and is, in the illustrated example, a lower surface. The second surface Wb is another surface of the web W and is, in the illustrated example, an upper surface.

The moisture adding unit 78 adds water vapor or mist such as ultrasonic mist to the first surface Wa of the web W. The moisture adding unit 78 is configured by, for example, a humidifier, an ink jet, a shower, or the like. In the illustrated example, moisture is released upward from the moisture adding unit 78.

The moisture adding unit 78 adds moisture to the web W so that the moisture content of the web W is equal to or more than 12 mass % and equal to or less than 40 mass %, more preferably equal to or more than 14 mass % and equal to or less than 35 mass %, further more preferably equal to or more than 15 mass % and equal to or less than 30 mass %. The moisture content of the web W is measured by, for example, a heat drying type moisture meter. When the moisture content of the web W is made equal to or more than 12 mass %, a plurality of fibers contained in the defibrated product can be bound by a hydrogen bond. When the moisture content of the web W is made equal to or less than 40 mass %, the web W can be more easily transported and formed.

1.4. Heating Unit

The heating unit 82 heats the web W to which moisture has been added by the moisture adding unit 78. Since the moisture of the web W evaporates by the heat of the heating unit 82, a plurality of fibers is bonded by a hydrogen bond. As a result, the sheet S having a high mechanical strength can be formed. Moreover, when a water-soluble polysaccharide is contained as an additive, since the temperatures of the moisture and the water-soluble polysaccharide rise by the heat of the heating unit 82, the water-soluble polysaccharide is gelatinized, and then, the moisture evaporates, thereby a plurality of fibers being bound through the gelatinized water-soluble polysaccharide. As a result, the sheet S having a higher mechanical strength can be formed. Moreover, when resin is contained as an additive, the resin is softened by the heat, and a plurality of fibers is bound through the softened resin. As a result, the sheet S having a higher mechanical strength can be formed.

The heating unit 82 has a first portion 84 that comes in contact with the first surface Wa of the web W and a second portion 86 that comes in contact with the second surface Wb of the web W. The first portion 84 and the moisture adding unit 78 are provided on the first surface Wa side. In the illustrated example, the first portion 84 is provided on the lower side of the web W, and the second portion 86 is provided on the upper side of the web W.

The heating unit 82 is configured by, for example, a heating roller, a heat press molding machine, a hot plate, a warm air blower, an infrared heating machine, or a flash fixing device. In the illustrated example, the heating unit 82 is a pair of rollers. The first portion 84 is one roller of the pair of rollers and the second portion 86 is another roller of the pair of rollers. Each of the rollers that configure the first portion 84 and the second portion 86 is formed by, for example, forming a rubber layer around an aluminum core metal and forming a fluorine layer on the surface of the rubber layer. By configuring the heating unit 82 as a pair of rollers, compared to when the heating unit 82 is configured as a plate-shaped press apparatus, the sheet S can be formed while the web W is continuously transported.

The heating unit 82 heats the web W in a state of the surface temperature of the first portion 84 being higher than the surface temperature of the second portion 86. The surface of the first portion 84 is a surface of the first portion 84 that comes in contact with the web W. The surface of the second portion 86 is a surface of the second portion 86 that comes in contact with the web W.

The heating unit 82 heats the web W in a state of the surface temperature of the first portion 84 being, for example, equal to or more than 80° C. and equal to or less than 130° C., preferably equal to or more than 85° C. and equal to or less than 120° C., and more preferably equal to or more than 90° C. and equal to or less than 110° C.

The heating unit 82 heats the web W in a state of the surface temperature of the second portion 86 being, for example, equal to or more than 100° C. and equal to or less than 160° C., preferably equal to or more than 110° C. and equal to or less than 150° C., and more preferably equal to or more than 120° C. and equal to or less than 140° C.

The heating unit 82 heats the web W in a state of the difference between the surface temperature of the first portion 84 and the surface temperature of the second portion 86 being, for example, equal to or more than 10° C. and equal to or less than 50° C., preferably equal to or more than 15° C. and equal to or less than 40° C., and more preferably equal to or more than 20° C. and equal to or less than 30° C.

The heating unit 82 heats the web W in a state of the sum of the surface temperature of the first portion 84 and the surface temperature of the second portion 86 being, for example, equal to or more than 180° C. and equal to or less than 240° C., preferably equal to or more than 210° C. and equal to or less than 240° C., and more preferably equal to or more than 230° C. and equal to or less than 240° C.

In addition, the heating unit 82 pressurizes the web W to which moisture has been added. In the illustrated example, the heating unit 82 pressurizes the web W while pinching the web W with the first portion 84 and the second portion 86. The heating unit 82 pressurizes the web W at a pressure of, for example, equal to or more than 0.2 MPa and equal to or less than 10 MPa, preferably equal to or more than 0.3 MPa and equal to or less than 5 MPa, and further more preferably equal to or more than 0.4 MPa and equal to or less than 1 MPa. In the illustrated example, since the heating unit 82 has a function to pressurize the web W, the sheet manufacturing apparatus 100 does not separately have a mechanism for pressurizing the web W.

1.5. Effects

The sheet manufacturing apparatus 100 includes the accumulating unit 60 that causes a defibrated product to accumulate in a dry manner and forms the web W, the moisture adding unit 78 that adds moisture from the side of one surface Wa of the web W that has been formed, such that the moisture content of the web W is equal to or more than 12 mass % and equal to or less than 40 mass %, and the heating unit 82 that heats the web W to which moisture has been added. The heating unit 82 has the first portion 84 that comes in contact with the one surface Wa of the web W and the second portion 86 that comes in contact with another surface Wb of the web W, and the heating unit 82 heats the web W in a state of the surface temperature of the first portion 84 being higher than the surface temperature of the second portion 86.

As a result, as indicated in examples and comparative examples described later, in the sheet manufacturing apparatus 100, compared to when the web W is heated in a state of the surface temperature of the first portion and the surface temperature of the second portion being the same, the paper dust amount generated in the sheet S can be reduced. In the sheet manufacturing apparatus 100, the one surface Wa side, which has a larger moisture content, is heated at a temperature higher than the temperature on the another surface Wb side. Accordingly, the moisture content can be made appropriate for generating a hydrogen bond on the one surface Wa side and the another surface Wb side. As a result, a plurality of fibers can be firmly bound by a hydrogen bond, and the paper dust mount can be reduced.

In the sheet manufacturing apparatus 100, the heating unit 82 heats the web W in a state of the difference between the surface temperature of the first portion 84 and the surface temperature of the second portion 86 being equal to or more than 10° C. and equal to or less than 50° C. As a result, in the sheet manufacturing apparatus 100, the paper dust amount can be further reduced.

In the sheet manufacturing apparatus 100, the heating unit 82 heats the web W in a state of the sum of the surface temperature of the first portion 84 and the surface temperature of the second portion 86 being equal to or more than 180° C. and equal to or less than 240° C. By making the sum of the surface temperature of the first portion 84 and the surface temperature of the second portion 86 equal to or more than 180° C., the production efficiency of the sheet S can be improved. When the sum of the surface temperature of the first portion 84 and the surface temperature of the second portion 86 is less than 180° C., a hydrogen bond cannot be sufficiently generated unless the speed at which the web W passes in the heating unit 82 is reduced, and thus the production efficiency is reduced. By making the sum of the surface temperature of the first portion 84 and the surface temperature of the second portion 86 equal to or less than 240° C., the paper dust amount can be further reduced.

In the sheet manufacturing apparatus 100, the heating unit 82 pressurizes the web W at a pressure of equal to or more than 0.2 MPa and equal to or less than 10 MPa. As a result, in the sheet manufacturing apparatus 100, a mechanism for pressurizing the web W does not have to be separately provided, and the size of the apparatus can be reduced. Moreover, by pressurizing the web W at a pressure of equal to or more than 0.2 MPa, the strength of the sheet S can be increased. By pressurizing the web W at a pressure of equal to or less than 10 MPa, fibers can be inhibited from deteriorating. As a result, another sheet can be manufactured using, as a raw material, a defibrated product made by defibrating a manufactured sheet.

The sheet manufacturing apparatus 100 includes the additive supply unit 52 as a binding agent adding unit that adds a binding agent to at least one of the defibrated product and the web W. As a result, in the sheet manufacturing apparatus 100, the strength of the sheet S can be increased.

In the sheet manufacturing apparatus 100, the moisture adding unit 78 adds water vapor or mist to the web W. As a result, in the sheet manufacturing apparatus 100, moisture can be uniformly added to the web W.

The sheet manufacturing apparatus 100 includes the cutting unit 90 that cuts the web W that has been heated. In the sheet manufacturing apparatus 100, since the heating unit 82 heats the web W in a state of the surface temperature of the first portion 84 being higher than the surface temperature of the second portion 86, even when the cutting unit 90 cuts the heated web W, the paper dust amount to be generated can be reduced.

2. Sheet Manufacturing Method

Figure 2:
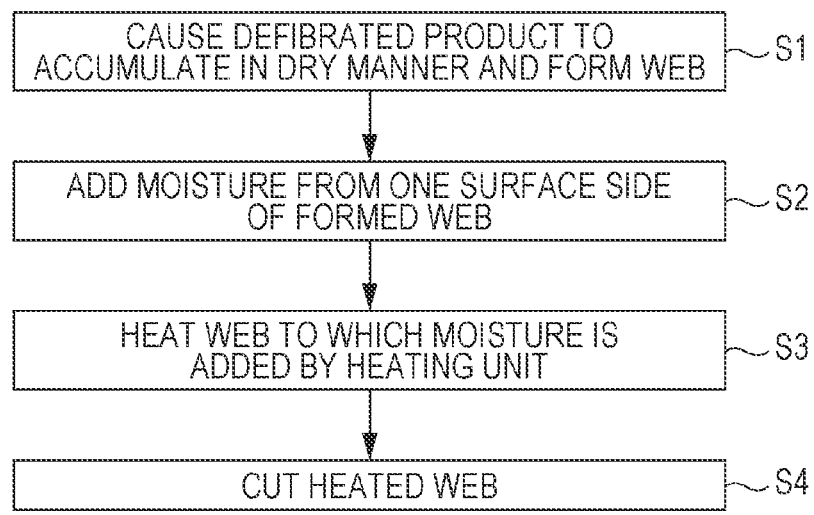
FIG. 2 is a flowchart for explaining a sheet manufacturing method according to the present embodiment.

Next, a sheet manufacturing method according to the present embodiment will be described with reference to the drawings. FIG. 2 is a flowchart for explaining the sheet manufacturing method according to the present embodiment. The sheet manufacturing method according to the present embodiment can be performed by using, for example, the above-described sheet manufacturing apparatus 100.

As illustrated in FIG. 2, the sheet manufacturing method according to the present embodiment includes a step of causing a defibrated product to accumulate in a dry manner and forming the web W (Step S1), a step of adding moisture from the one surface Wa side of the formed web W and making the moisture content of the web W equal to or more than 12 mass % and equal to or less than 40 mass % (Step S2), a step of heating, by the heating unit 82, the web W to which moisture is added (Step S3), and a step of cutting the heated web W (Step S4).

The step of forming the web W (Step S1) can be performed by, for example, the accumulating unit 60 of the sheet manufacturing apparatus 100.

The step of adding moisture from the one surface Wa side of the formed web W (Step S2) can be performed by, for example, the moisture adding unit 78 of the sheet manufacturing apparatus 100.

In the step of heating the web W by the heating unit 82 (Step S3), the web W is heated in a state of the surface temperature of the first portion 84 being higher than the surface temperature of the second portion 86.

The step of cutting the heated web W (Step S4) can be performed by, for example, the cutting unit 90 of the sheet manufacturing apparatus 100.

The sheet manufacturing method according to the present embodiment may include a step of adding a binding agent to at least one of the defibrated product and the web W before the step of heating the web W. The step of adding a binding agent can be performed by, for example, the additive supply unit 52 of the sheet manufacturing apparatus 100.

Moreover, in addition to the above-described steps, the sheet manufacturing method according to the present embodiment may include, for example, a defibrating step, a sorting step, and the like. These steps can be performed by the defibrating unit 20, the sorting unit 40, and the like of the sheet manufacturing apparatus 100.

3. Examples and Comparative Examples

3.1. Manufacturing Sheet

A sheet is manufactured using an apparatus corresponding to the above-described sheet manufacturing apparatus 100. Specifically, after a defibrated product is caused to accumulate in a dry manner and a web is formed and then a moisture adding unit adds moisture to the web, a heating unit pressurizes and heats the web to which moisture has been added to manufacture a sheet. The moisture has been added from below the web. In addition, a sheet is manufactured in different cases where a binding agent is added to the defibrated product and where a binding agent is not added.

As a raw material, recycled paper GR70W of FUJIFILM Business Innovation Corp. (67 $g/cm^2$ basis weight) is used. The moisture adding unit ejects ultrasonic mist from below the web such that the moisture content of the sheet is 20 mass %. As the binding agent, Lustergen FK, starch manufactured by Nippon Starch Chemical Co., Ltd., is used. A 13 mass % binding agent is added relative to the total amount of the defibrated product before moisture is added. As the heating unit, a pair of rollers, in which a rubber layer and a fluorine layer are formed on an aluminum core metal with a diameter of 100 mm, is used. The pair of rollers pinches the web and pressurizes the web at a pressure of 0.6 MPa. The surface temperatures of the rollers are varied.

3.2 Evaluation Method

Figure 3:
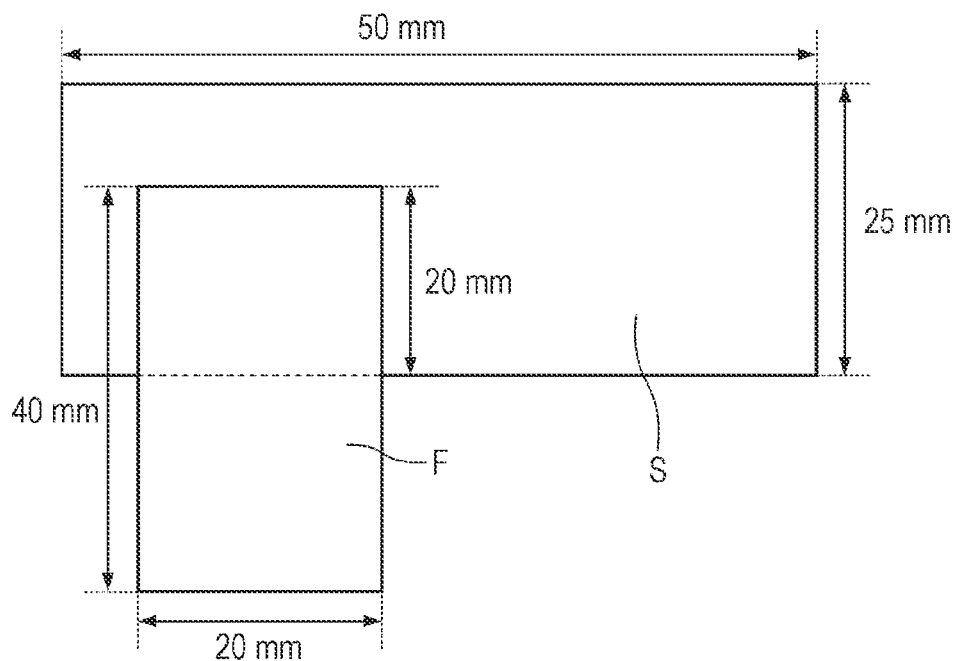
FIG. 3 is a diagram for explaining a method for measuring a paper dust amount of a manufactured sheet.

The paper dust amount of the sheet manufactured as described above has been measured. FIG. 3 is a diagram for explaining the method for measuring the powder dust amount of the manufactured sheet.

As illustrated in FIG. 3, the manufactured sheet S is cut into 50 mm×25 mm pieces. Moreover, a self-adhesive film F manufactured by Panac Industries, Inc. is cut into 20 mm×40 mm pieces.

Next, a protection film and a base film of the self-adhesive film F pinch the sheet S, and the self-adhesive film F is pressurized for three seconds at 10 kN by a hand press without being heated. Then, within three minutes after the self-adhesive film F has been pressurized, in the state of the self-adhesive film F being lifted, the sheet S is peeled upward with great force with the right half of the sheet S is held. Next, the surface of the base film is protected again with the protection film.

Next, the brightness of Digital Microscope VHX-5000 manufactured by Keyence Corporation is set to Manual 6 msec, the base film is observed at 20× magnification, and an image is acquired. Next, high dynamic range (HDR) image processing is performed on the acquired image, and then the area is measured by performing automatic area measurement processing, and the image is saved. The HDR image processing is performed under the condition of brightness/texture/contrast/color=30/0/100/0. The automatic area measurement processing is performed under the condition of brightness 90 to 255, the maximum area>2500. Note that the brightness of the HDR image processing and the automatic area measurement processing is adjusted where necessary in the case of much noise. Next, binarization processing is performed on the saved image, and the number of pieces of paper dust is calculated to obtain the paper dust amount.

The evaluation standards for the paper dust amount are as follows:
A: Equal to or less than 120
B: Equal to or more than 121 and equal to or less than 150
C: Equal to or more than 151 and equal to or less than 200
D: Equal to or more than 201

3.3 Evaluation Result

FIG. 4 is a table indicating the evaluation result of the paper dust amount of the manufactured sheet.

In FIG. 4, Tu indicates the surface temperature of the upper roller of the pair of rollers (hereinafter, also referred to as upper roller temperature). Td indicates the surface temperature of the lower roller of the pair of rollers (hereinafter, also referred to as lower roller temperature). Td−Tu indicates a value obtained by subtracting the upper roller temperature from the lower roller temperature. Td+Tu indicates the total value of the lower roller temperature and the upper roller temperature.

As FIG. 4 illustrates, the examples 1 to 5, in which the lower roller temperature is higher than the upper roller temperature, have a low paper dust amount compared to the comparative example 1, in which the lower roller temperature and the upper roller temperature are the same, and the comparative example 2, in which the upper roller temperature is higher than the lower roller temperature. Accordingly, it is understood that, by making the temperature of the roller on a side where moisture is added higher than the temperature of the roller on a side where moisture is not added, the paper dust amount can be reduced.

In addition, the examples 2 and 4, in which the differences between the lower roller temperature and the upper roller temperature are 20° C. and 30° C., respectively, have a lower paper dust amount than that of the examples 1, 3, and 5. Accordingly, it is understood that, by making the difference between the lower roller temperature and the upper roller temperature equal to or more than 20° C. and equal to or less than 30° C., the paper dust amount can be further reduced.

The present disclosure includes configurations substantially the same as the configurations described in the embodiment, for example, configurations having the same functions, methods, and results or configurations having the same purposes and effects. Moreover, the present disclosure includes configurations in which non-essential parts of the configurations described in the embodiment are replaced. Moreover, the present disclosure includes configurations that exhibit the same effects or configurations that can achieve the same purposes as the configurations described in the embodiment. Moreover, the present disclosure includes configurations in which the known art is added to the configurations described in the embodiment.

The following content is derived from the above-described embodiment.

One aspect of a sheet manufacturing apparatus includes an accumulating unit that causes a defibrated product to accumulate in a dry manner and forms a web, a moisture adding unit that adds moisture from a side of one surface of the formed web such that a moisture content of the web is equal to or more than 12 mass % and equal to or less than 40 mass %, and a heating unit that heats the web to which moisture is added. The heating unit has a first portion that comes in contact with the one surface of the web and a second portion that comes in contact with another surface of the web. The heating unit heats the web in a state of a surface temperature of the first portion being higher than a surface temperature of the second portion.

According to the sheet manufacturing apparatus, the paper dust amount can be reduced.

In one aspect of the sheet manufacturing apparatus, the heating unit may heat the web in a state of the difference between the surface temperature of the first portion and the surface temperature of the second portion being equal to or more than 10° C. and equal to or less than 50° C.

According to the sheet manufacturing apparatus, the paper dust amount can be further reduced.

In one aspect of the sheet manufacturing apparatus, the heating unit may heat the web in a state of the sum of the surface temperature of the first portion and the surface temperature of the second portion being equal to or more than 180° C. and equal to or less than 240° C.

According to the sheet manufacturing apparatus, the production efficiency can be improved and the paper dust amount can be further reduced.

In one aspect of the sheet manufacturing apparatus, the heating unit may pressurize the web at a pressure of equal to or more than 0.2 MPa and equal to or less than 10 MPa.

According to the sheet manufacturing apparatus, a mechanism for pressurizing the web does not have to be separately provided, and the size of the apparatus can be reduced.

In one aspect of the sheet manufacturing apparatus, a binding agent adding unit that adds a binding agent to at least one of the defibrated product and the web may be included.

According to the sheet manufacturing apparatus, the strength of a sheet can be increased.

In one aspect of the sheet manufacturing apparatus, the moisture adding unit may add water vapor or mist to the web.

According to the sheet manufacturing apparatus, moisture can be uniformly added to the web.

In one aspect of the sheet manufacturing apparatus, a cutting unit that cuts the heated web may be included.

According to the sheet manufacturing apparatus, since the heating unit heats the web in the state of the surface temperature of the first portion being higher than the surface temperature of the second portion, the paper dust amount to be generated can be reduced even when the cutting unit cuts the heated web.

One aspect of a sheet manufacturing method includes causing a defibrated product to accumulate in a dry manner and forming a web, adding moisture from a side of one surface of the formed web such that a moisture content of the web is equal to or more than 12 mass % and equal to or less than 40 mass %, and heating, by a heating unit, the web to which moisture is added. The heating unit has a first portion that comes in contact with the one surface of the web and a second portion that comes in contact with another surface of the web. In the heating the web by the heating unit, the web is heated in a state of a surface temperature of the first portion being higher than a surface temperature of the second portion.

According to the sheet manufacturing method, the paper dust amount can be reduced.

In one aspect of the sheet manufacturing method, before the heating the web by the heating unit, adding a binding agent to at least one of the defibrated product and the web may be included.

According to the sheet manufacturing method, the strength of a sheet can be increased.

In one aspect of the sheet manufacturing method, cutting the heated web may be included.

According to the sheet manufacturing method, since the web is heated in the state of the surface temperature of the first portion being higher than the surface temperature of the second portion, the paper dust amount to be generated can be reduced even when a cutting unit cuts the heated web.

What is claimed is:

1. A sheet manufacturing apparatus comprising: an accumulating unit including a sieve through which a defibrated product passes in a dry manner to form a web; a moisture adding unit that is disposed downstream relative to the accumulating unit in a transfer direction of the web and disposed so as to face one surface of the formed web, and that adds moisture to the formed web such that a moisture content of the web is equal to or more than 12 mass % and equal to or less than 40 mass %; and a heating unit disposed downstream relative to the moisture adding unit in the transfer direction of the web, the heating unit having a first heater that comes in contact with the one surface of the web and a second heater that comes in contact with another surface of the web, and the first and second heaters being configured to heat the web with the web being located between the first and second heaters, while a surface temperature of the first heater is higher than a surface temperature of the second heater, and while a difference between the surface temperature of the first heater and the surface temperature of the second heater is equal to or more than 10° C. and equal to or less than 50° C. when compared to respective first and second heaters being at the same surface temperature.

2. The sheet manufacturing apparatus according to claim 1, wherein
the first and second heaters heat the web while a sum of the surface temperature of the first heater and the surface temperature of the second heater is equal to or more than 180° C. and equal to or less than 240° C.

3. The sheet manufacturing apparatus according to claim 1, wherein
the first and second heaters apply pressure to the web at a pressure of equal to or more than 0.2 MPa and equal to or less than 10 MPa.

4. The sheet manufacturing apparatus according to claim 1, further comprising:
a binding agent supplying unit disposed upstream relative to the accumulating unit in a transfer direction of the defibrated product, or disposed downstream relative to the accumulating unit in the transfer direction of the web, the binding agent supplying unit supplying a binding agent to at least one of the defibrated product and the web.

5. The sheet manufacturing apparatus according to claim 1, wherein
the moisture adding unit adds water vapor or mist to the web.

6. The sheet manufacturing apparatus according to claim 1, further comprising:
a cutting unit that is disposed downstream relative to the first and second heaters in the transfer direction of the web and cuts the web heated.

7. A sheet manufacturing method comprising: sieving a defibrated product to accumulate in a dry manner and forming a web; adding moisture to the formed web by a moisture adding unit disposed so as to face one surface of the formed web, such that a moisture content of the web is equal to or more than 12 mass % and equal to or less than 40 mass %; and heating, by a heating unit, the web to which moisture is added, the heating unit having a first heater that comes in contact with the one surface of the web, and a second heater that comes in contact with another surface of the web, the heating being performed by the first and second heaters while the web is being located between the first and second heaters, and the heating being performed by the first and second heaters while a surface temperature of the first heater is higher than a surface temperature of the second heater, and while a difference between the surface temperature of the first heater and the surface temperature of the second heater is equal to or more than 10° C. and equal to or less than 50° C. when compared to respective first and second heaters being at the same surface temperature.

8. The sheet manufacturing method according to claim 7, further comprising:
adding, before the heating the web by the heating unit, a binding agent to at least one of the defibrated product and the web.

9. The sheet manufacturing method according to claim 7, further comprising:
cutting the web heated.

* * * * *